(12) United States Patent  (10) Patent No.: US 7,891,807 B2
Mansuy  (45) Date of Patent: Feb. 22, 2011

(54) DECORATIVE EYEGLASS TEMPLES

(76) Inventor: Ana Nichole Mansuy, 7204 Jasmine Dr., Commerce Township, MI (US) 48390

( * ) Notice: Subject to any disclaimer, the term of this patent is extended or adjusted under 35 U.S.C. 154(b) by 0 days.

(21) Appl. No.: 12/482,478

(22) Filed: Jun. 11, 2009

(65) Prior Publication Data

US 2010/0315586 A1    Dec. 16, 2010

(51) Int. Cl.
G02C 11/02    (2006.01)
(52) U.S. Cl. ........................... 351/51; 351/52
(58) Field of Classification Search ............. 351/41, 351/51, 52, 111, 158
See application file for complete search history.

(56) References Cited

U.S. PATENT DOCUMENTS 2,442,483 A *  6/1948  Blasi ........................... 351/51
2,482,195 A     9/1949  Martin
3,021,753 A     2/1962  Vinson
3,582,192 A     6/1971  Gitlin
4,806,008 A     2/1989  Tarloff
4,958,923 A     9/1990  Rosenson
6,089,707 A     7/2000  Shapiro
6,957,890 B2   10/2005  Shapiro
7,261,409 B1    8/2007  Taber
2007/0273823 A1 11/2007 Lee et al.
2008/0259269 A1 10/2008 Grogan et al.

FOREIGN PATENT DOCUMENTS

JP    3-238418    * 10/1991    ................... 351/52

* cited by examiner

Primary Examiner—Huy K Mai
(74) Attorney, Agent, or Firm—Frederick W. Mau, II

(57) ABSTRACT

Eyeglasses having temples with detachable decorative pieces. The decorative pieces generally comprise an inner piece and outer piece which connect to one another through and/or around the eyeglass temples. When attached together, the outer decorative piece and the inner decorative piece are supported by and attached to the eyeglass temples.

6 Claims, 4 Drawing Sheets

DECORATIVE EYEGLASS TEMPLES

FIELD OF THE INVENTION

The present invention generally relates to eyeglasses. More particularly, the present invention relates to decorative temples for eyeglasses.

BACKGROUND

In addition to being used for correcting vision or blocking sunlight, eyeglasses have become widely utilized as fashion accessories. Eyeglass frames have temples that come in wide varieties of colors, shapes and sizes that provide aesthetically pleasing designs. While it is desired to accessorize with eyeglasses can prove to be quite expensive. For instance, one may wish to have a separate set of eyeglasses for certain type of outfit based on the color or design of the eyeglasses. This will cause an individual to have multiple pairs of eyeglasses to accessorize with multiple outfits.

To overcome this problem of needing multiple sets of eyeglasses to accessorize with multiple outfits, eyeglasses have been developed which provide detachable decorative pieces which attach to the outer sides of the temples. The decorative pieces may be magnetically attached or clipped to the eyeglass temples. The outer decorative pieces may be interchanged to provide eyeglasses with different designs to provide a variety of looks based on the desire of the user. Such designs are described in detail in U.S. Pat. Nos. 6,089,707; 6,957,890; and U.S. Pat. Pub. 2007/0273823. Which such designs provide the user with eyeglasses configurable into a variety of appearances, there still remains a need in the art for additional options to configure the appearance of eyeglasses.

SUMMARY OF THE INVENTION

Disclosed herein, is an eyeglass frame assembly comprising a right temple and a left temple. The right temple and the left temple each comprise a temple arm, an inner decorative piece, and an outer decorative piece, whereby the inner decorative piece and the outer decorative piece are supported by the temple arm. The inner decorative piece and the outer decorative piece may be attached to one another through or around the temple arm. The outer decorative piece and/or the inner decorative piece may comprise a channel, whereby the channel receives at least a portion of the temple arm.

The inner decorative piece and the outer decorative piece may be attached to one another via one or more magnets and/or magnetically attractable material. The inner decorative piece and the outer decorative piece may attach to one another via magnetic material or magnetically attractable material included in the edges of the inner decorative piece and the edges of the outer decorative piece.

The inner decorative piece and the outer decorative piece may also be attached to one another via one or more clips. The one or more clips may comprises a female portion and a male portion, whereby the female portion and the male portion are disposed on opposing inner sides of the inner decorative piece and the outer decorative piece. The one or more clips may connect together through the temple arms or around the temple arms.

DETAILED DESCRIPTION OF THE PREFERRED EMBODIMENTS OF THE INVENTION

In accordance with the present invention there are provided eyeglasses having decorative temples. The decorative temples are interchangeable to provide the user with a variety of colors, shapes, and sizes of eyeglass temples such that one pair of eyeglasses can have a variety of appearances.

Figure 1:
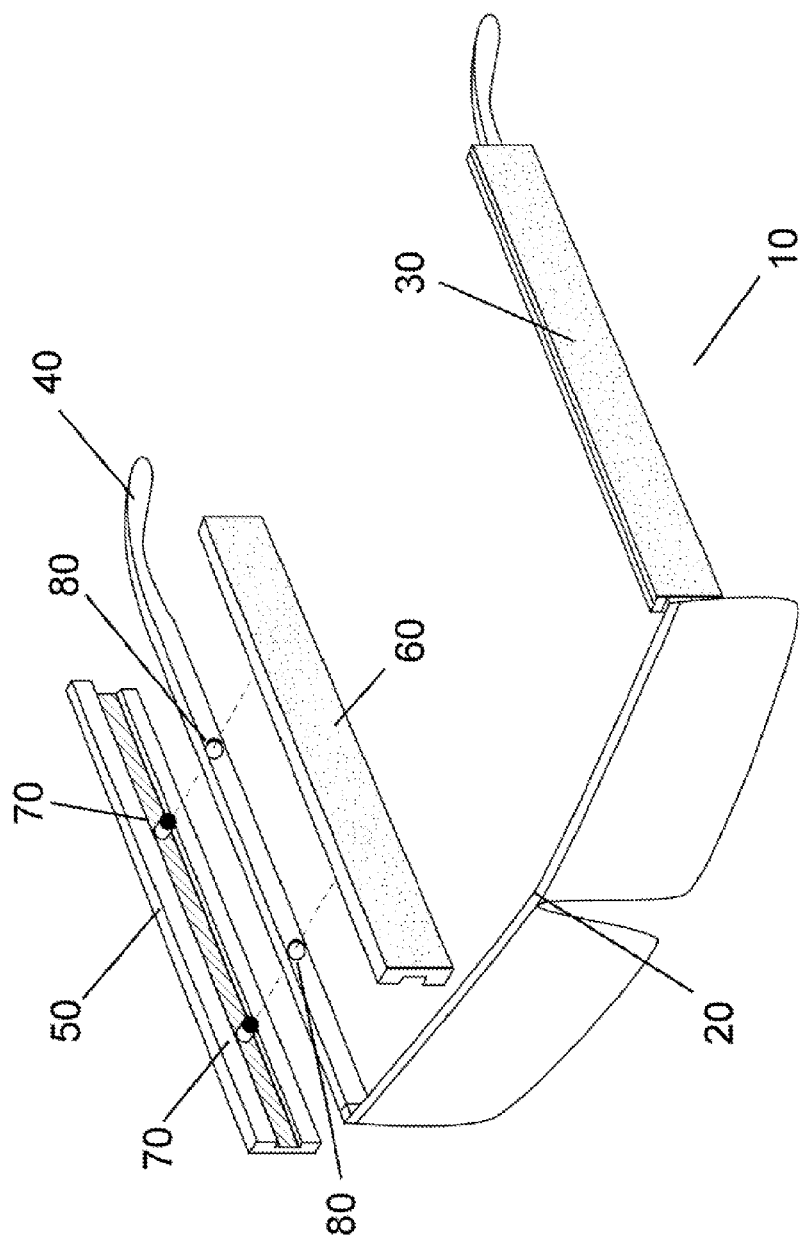
FIG. 1, is a depiction of eyeglasses having a eyeglass temple in accordance with the present invention.

Shown in FIG. 1, is a pair of eyeglasses 10 having interchangeable decorative temples in accordance with a first embodiment of the present invention. The eyeglasses generally comprise an eyeglass frame assembly 20 having left and right temples 30. The left and right eyeglass temples each comprise a temple arm 40 which supports an outer decorative piece 50 and an inner decorative piece 60. The outer decorative piece 50 and inner decorative piece 60 attach to one another resulting in a decorative temple assembly which is supported by the temple arm 40. The outer decorative piece and/or the inner decorative piece may include channels 45 which receive a portion of the temple arm to provide for a secure fit about the temple arm. The inner and outer decorative pieces may be attachable to one another via magnets or clips. As shown in FIG. 1, the outer decorative piece 50 may include one or more magnets 70 or magnetically attractable material which attach to corresponding magnets or magnetically attractable material on the inner decorative piece. The outer decorative piece 50 and the inner decorative piece 60 may attach to one another through one or more corresponding openings 80 in the temple arm.

Figure 2:
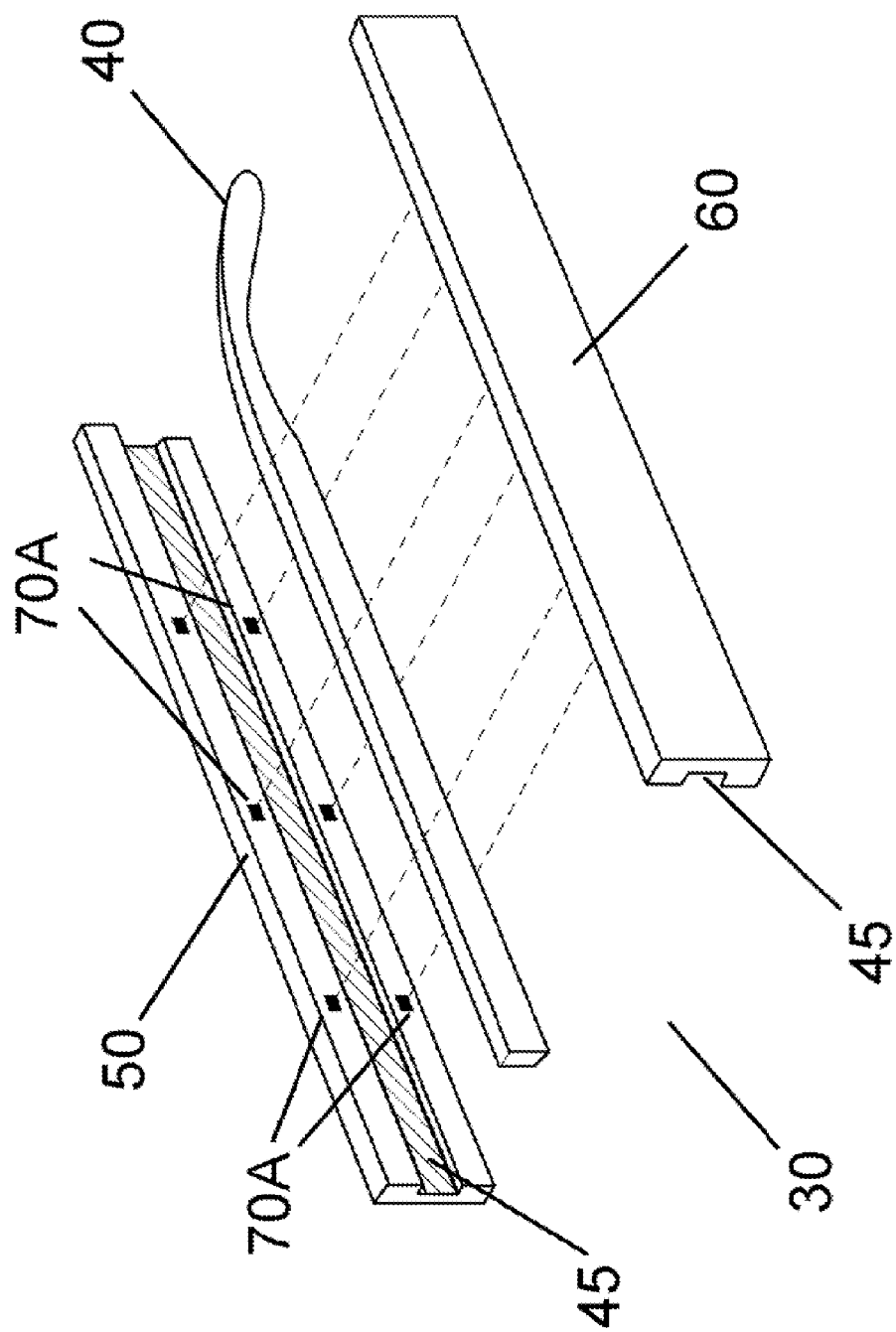
FIG. 2, is a depiction of a second embodiment an eyeglass temple in accordance with the present invention.

Shown in FIG. 2 is an alternative embodiment of the present invention whereby the outer decorative piece 50 and the inner decorative piece 60 attach to one another around the temple arm 40. In this embodiment, the edges of the outer decorative piece 50 and the edges of the inner decorative piece 60 include magnetic material 70A or magnetically attractable material which allow the edges of the outer decorative piece and the edges of the inner decorative piece to attach to one another around the temple arm.

Figure 3:
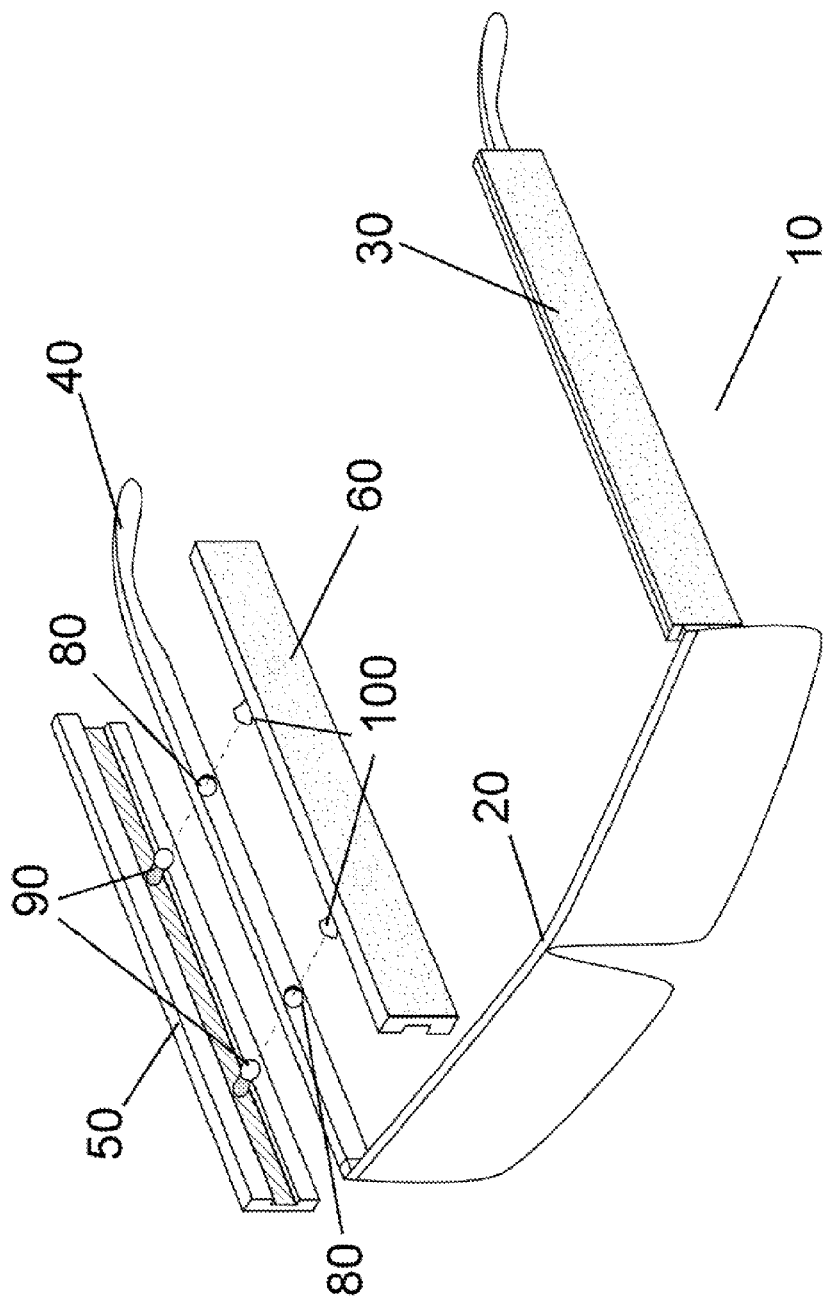
FIG. 3, is a depiction of a third embodiment an eyeglass temple in accordance with the present invention.

Shown in FIG. 3 is another alternative embodiment of the present invention. In this embodiment, the outer decorative piece 50 and the inner decorative piece 60 are mechanically connected to one another. The outer decorative piece and the inner decorative piece may be clipped to one another and supported by the temple arm 40. As shown in FIG. 3, a male connector and female connector may be used to attach the outer decorative piece 50 and the inner decorative piece 60. In this embodiment, the outer decorative piece may include a male connector 90 which attaches to a corresponding female connector 100 of the inner decorative piece through the temple arm 40. Alternatively, the outer decorative piece and the inner decorative piece may clip together around the temple arm.

Figure 4:
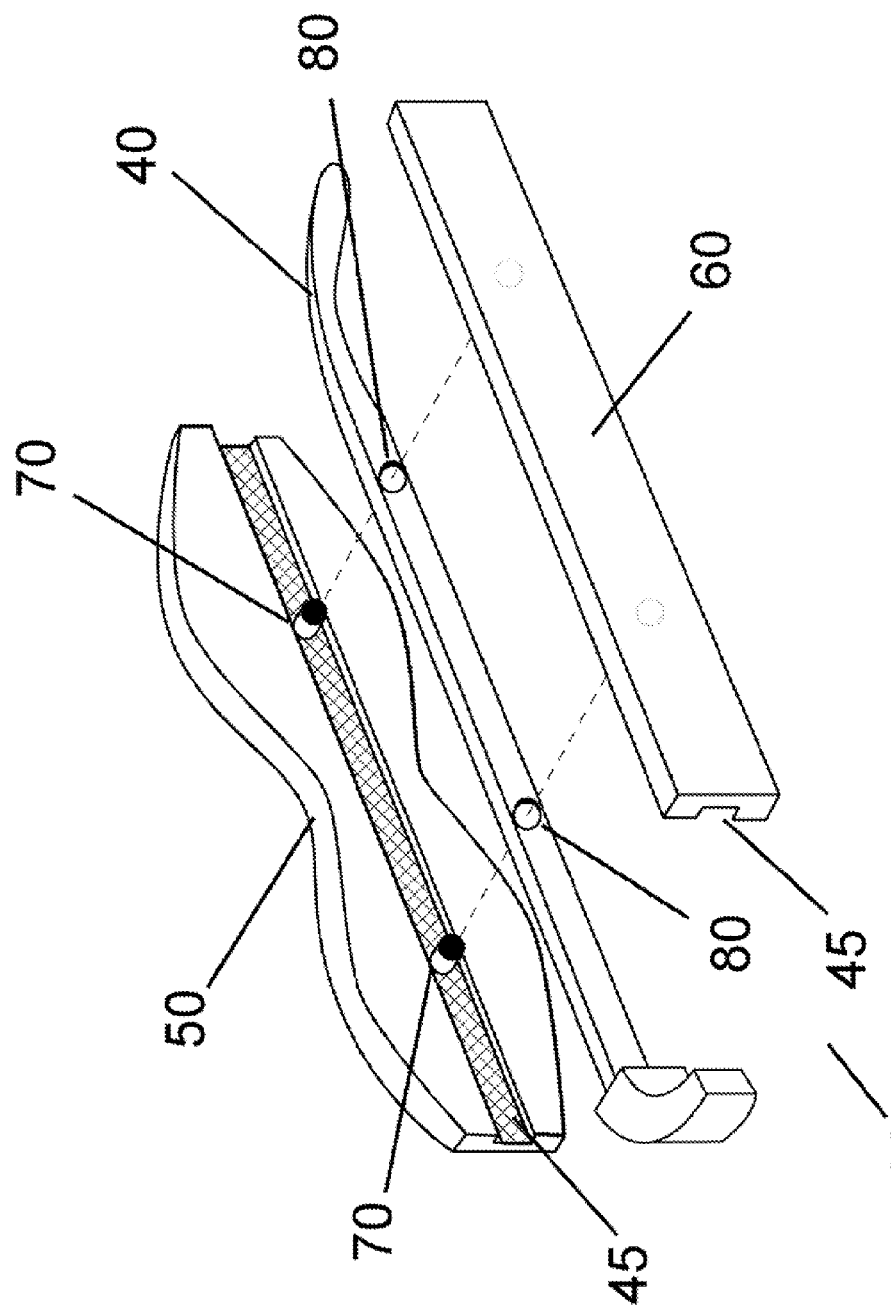
FIG. 4, is a depiction of a fourth embodiment an eyeglass temple in accordance with the present invention.

As described, the outer decorative piece 50 and/or the inner decorative piece 60 may provide a variety of appearances or styles to a single pair of eyeglasses. The decorative pieces may be formed from various types of materials such as plastic, composite material, metal, wood, and rubber. The decorative pieces may be available in any type color or color combination allowing the user to mix or match a variety of colors. The decorative pieces may also include various logos, designs, and pictures. The decorative pieces may also have various textures and/or various types of materials embedded in or attached to the surface of the decorative pieces. Examples of materials embedded in or attached to the surface of the temples include inlays, metal pieces, real and artificial gemstones, pictures, and the like. The temples may also be formed in a variety of shapes as shown in FIG. 4. The temple arms may also be formed from a variety of materials provided the temple arms are able to support the inner and outer decorative pieces. Such materials may include metal, plastic, composite materials, or any combination thereof.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. An eyeglass frame assembly comprising:
 a right temple and a left temple; said right temple and said left temple each comprising a temple arm, an inner decorative piece, and an outer decorative piece, said inner decorative piece and said outer decorative piece being supported by said temple arm and attached to one another via one or more magnets.

2. The eyeglass frame assembly according to claim 1, wherein said inner decorative piece and said outer decorative piece are attached to one another through said temple arm.

3. The eyeglass frame assembly according to claim 1, wherein said inner decorative piece and said outer decorative piece are attached to one another around said temple arm.

4. The eyeglass frame assembly according to claim 1, wherein said one or more magnets are included in the edges of said inner decorative piece and/or the edges of said outer decorative piece.

5. The eyeglass frame according to claim 1, wherein said outer decorative piece comprises a channel, said channel receiving at least a portion of said temple arm.

6. The eyeglass frame according to claim 1, wherein said inner decorative piece comprises a channel, said channel receiving at least a portion of said temple arm.

* * * * *